United States Patent [19]

Foster

[11] 3,966,229

[45] June 29, 1976

[54] PEDAL ACTUATED BICYCLE BRAKE

[76] Inventor: Edwin E. Foster, 1801 Camp Craft Road, Austin, Tex. 78746

[22] Filed: Oct. 10, 1974

[21] Appl. No.: 513,837

[52] U.S. Cl. .................................... 280/261; 188/24
[51] Int. Cl.$^2$ ......................................... B62L 5/00
[58] Field of Search ............. 280/259, 261; 188/24; 192/5

[56] References Cited

UNITED STATES PATENTS

| 625,415 | 5/1899 | Reber | 192/5 |
| 675,288 | 5/1901 | Nash | 192/5 |
| 2,201,902 | 5/1940 | Kormann | 192/5 |
| 2,949,990 | 8/1960 | Douglas | 192/5 |
| 3,486,586 | 12/1969 | Grier | 188/24 |
| 3,774,732 | 11/1973 | Basek | 188/24 |

FOREIGN PATENTS OR APPLICATIONS

| 522,059 | 6/1940 | United Kingdom | 188/24 |
| 558,211 | 12/1943 | United Kingdom | 188/24 |

Primary Examiner—M. H. Wood, Jr.
Assistant Examiner—Terrance L. Siemens
Attorney, Agent, or Firm—Ralph W. Kalish

[57] ABSTRACT

A bicycle having front and rear wheel caliper brake assemblies which are connected to a swingably mounted lever which in one form of the invention is operatively engaged to the pedal shaft through friction-producing elements as well as to cables controlling the brake assemblies so that upon back pedaling action the brakes will be automatically applied; but with there being a linkage connection between said lever and a pawl engageable with a driven sprocket on the rear axle to promote slackness in the transmission chain upon brake application. In another form of the invention, the particular lever member is operatively engageable with the pedal shaft by bearing elements carried thereon and to a front pawl lockable with a drive sprocket; and there being an elongated finger-like element fixed to the lever and engageable with the transmission chain for assuring of slackness therein upon release of the said front pawl. In a further form of the invention, the particular lever member is operatively connected to a pawl lockable with a driven sprocket by a cable from the front pawl, and with a spring element engaging the cable for causing slackness to develop in the transmission cable. The bicycle also incorporates a handle bar readily shiftable between touring and racing positions, as in ten-speed bicycles, and having shift controls in the ends thereof for actuation in like manner regardless of the position in which the handle bar may be disposed.

29 Claims, 26 Drawing Figures

FIG. 1

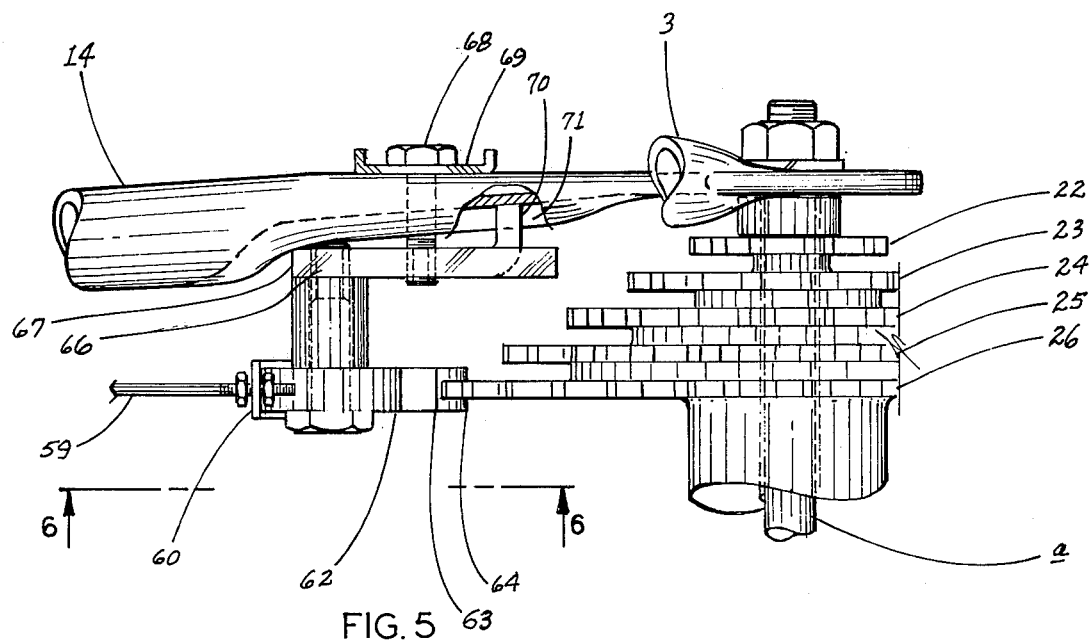
FIG. 5
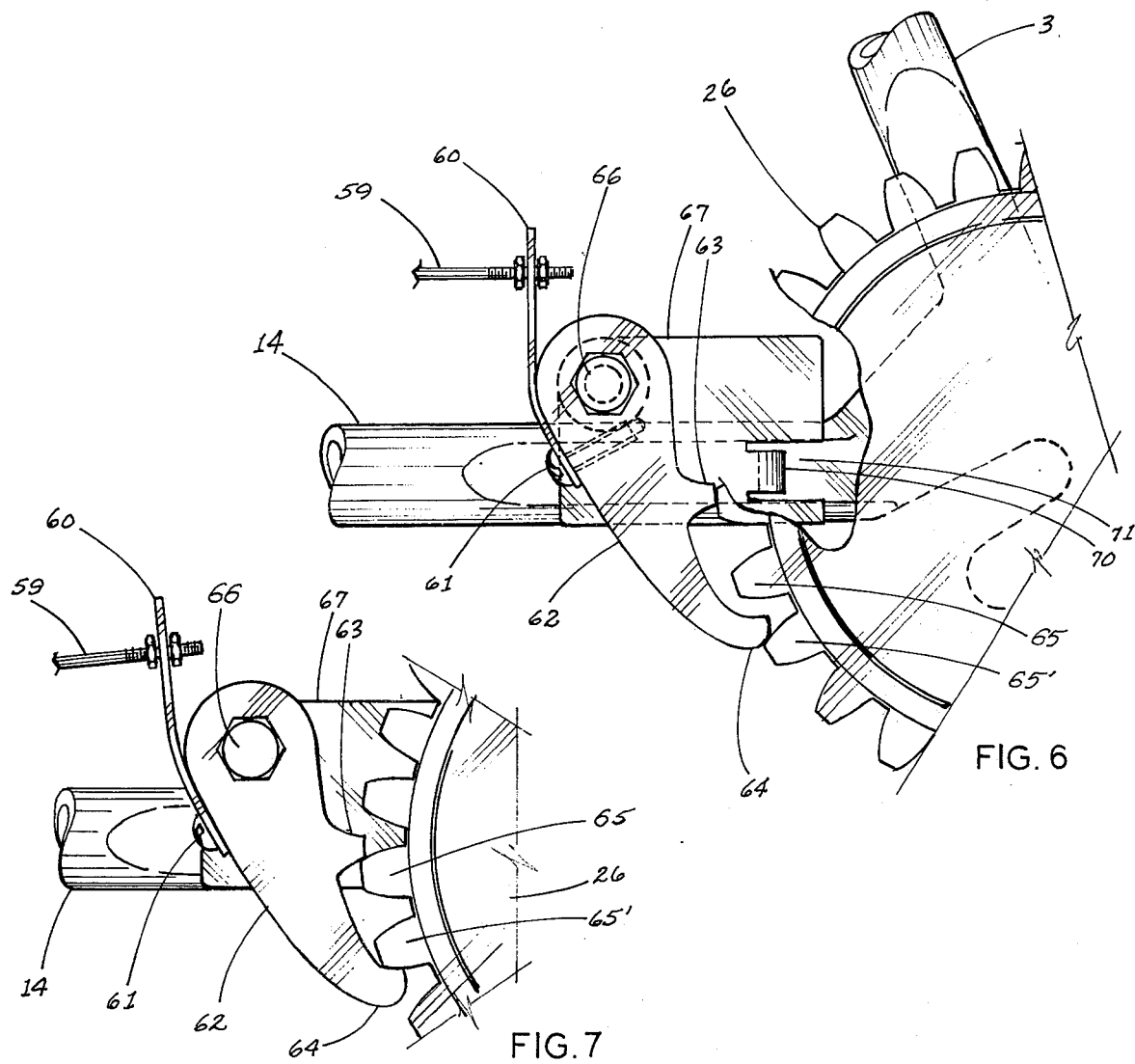
FIG. 6
FIG. 7

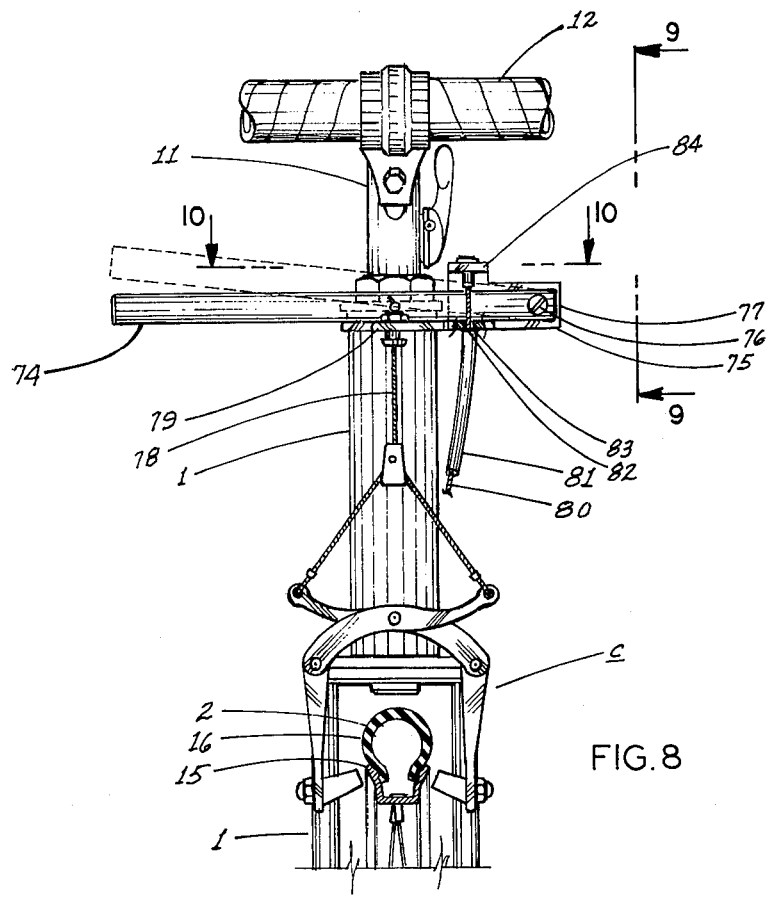
FIG. 8
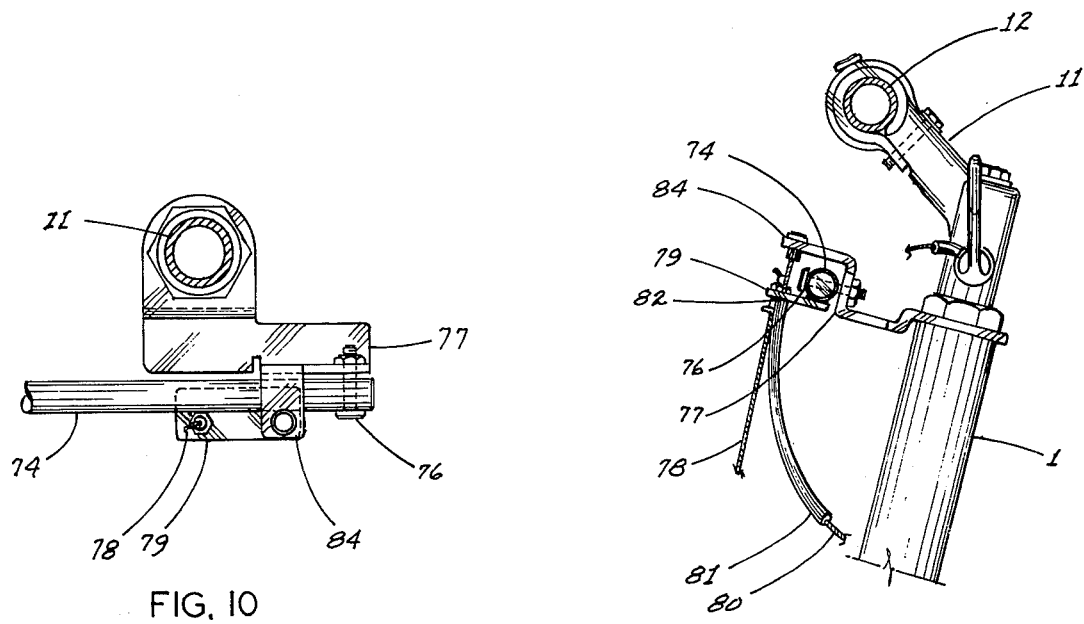
FIG. 10
FIG. 9

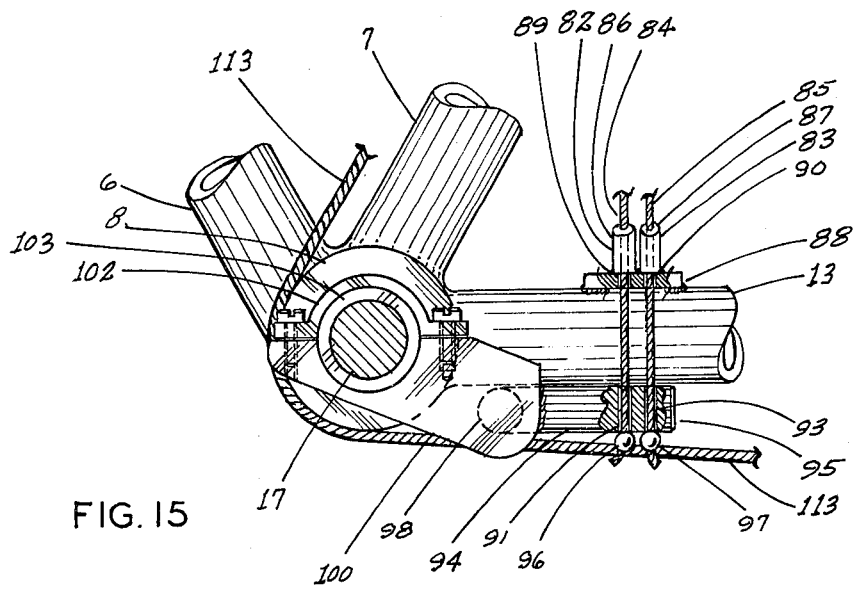
FIG. 15
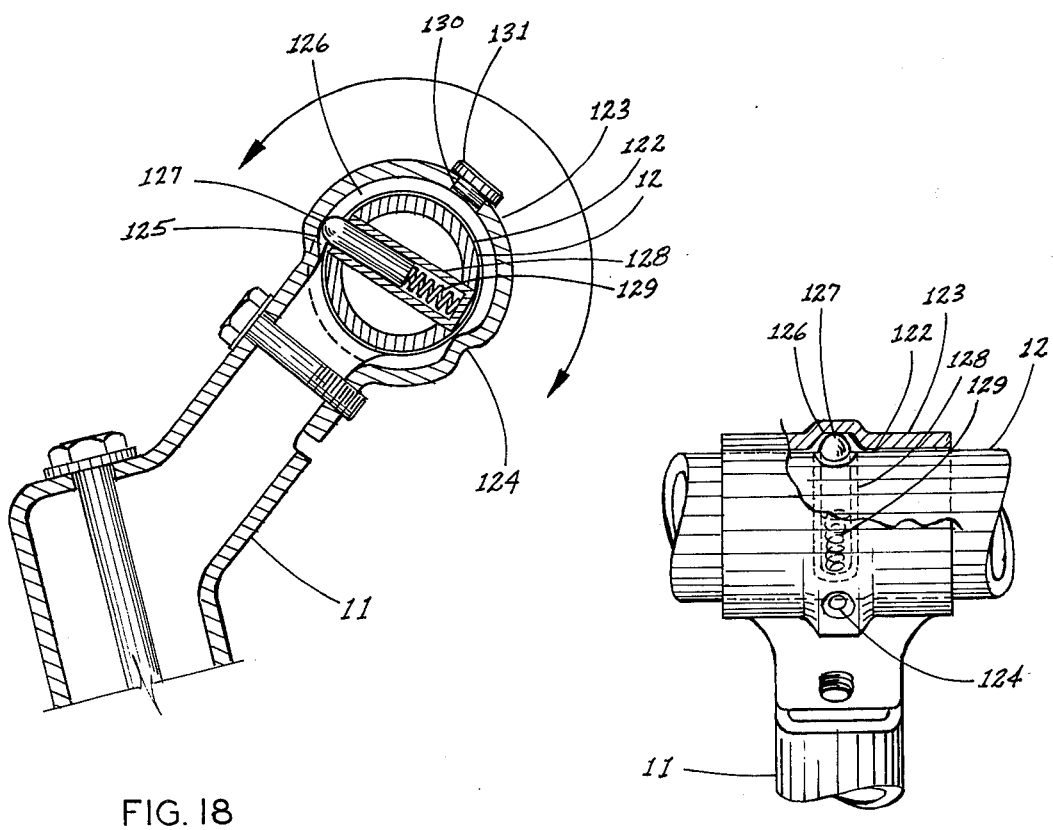
FIG. 18
FIG. 19

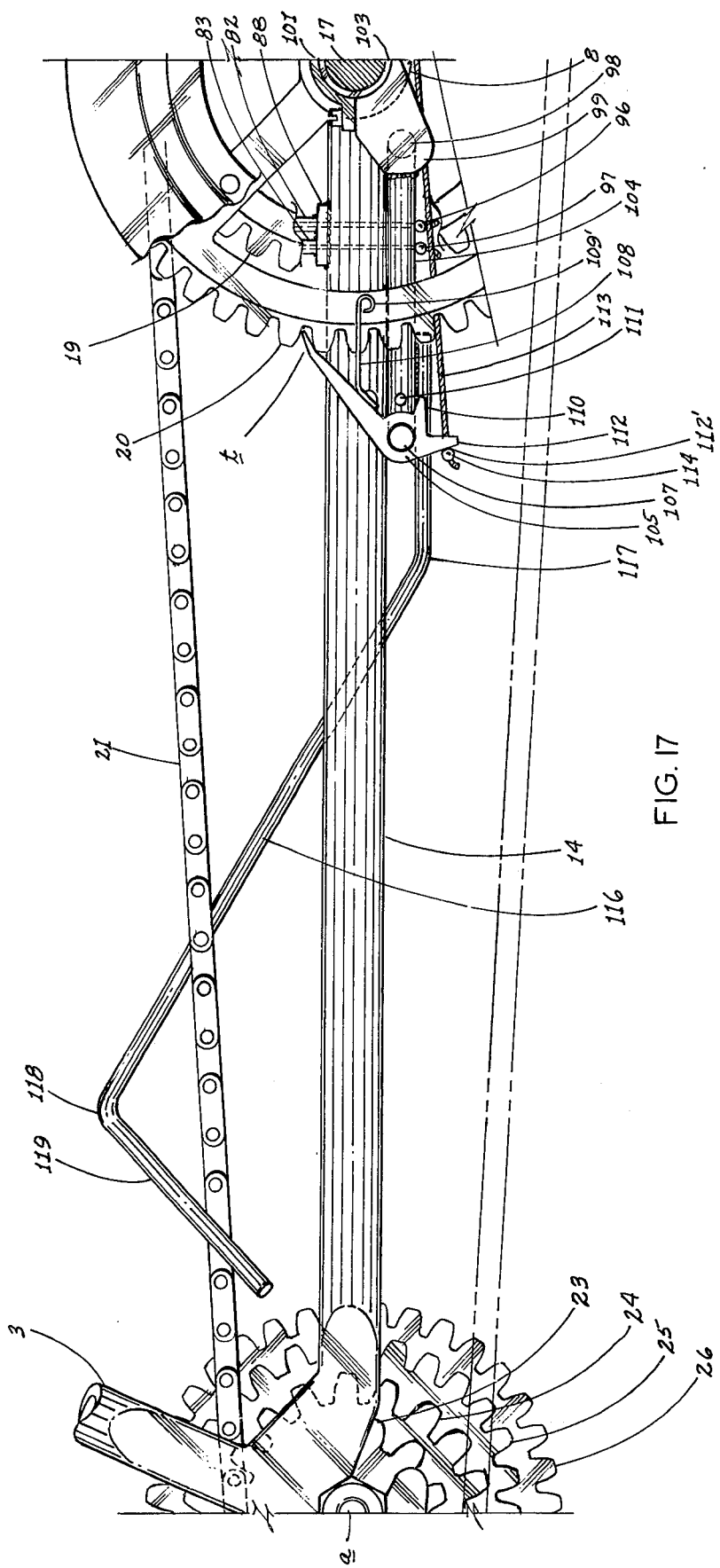

PEDAL ACTUATED BICYCLE BRAKE

BACKGROUND AND SUMMARY OF THE INVENTION

This invention relates in general to bicycles and, more particularly, to a pedal actuated braking system therefor.

Heretofore with bicycles of the popular ten-speed type, the brake assemblies are consistently operable by hand levers. However, in order to effect a shifting of the drive chain to bring about the particular gear ratio, additional levers must be manipulated by the rider. Consequently, the operation of the bicycle does make a substantial demand upon the use of the rider's hands other than for steering purposes. Additionally, the shift controls are located upon the steering stem or post and thus necessitates removal of the user's hands from the handle bar for operation.

Therefore, it is an object of the present invention to provide a bicycle which may be of the ten-speed type, but which incorporates pedal actuated brakes so that use of the hands for brake control is obviated.

It is another object of the present invention to provide a bicycle having brakes which are pedal actuated and incorporating structure for assuring of slackness in the upper course of the drive chain upon braking action so that forward travel may be resumed upon brake release without inhibition through tautness.

It is a further object of the present invention to provide a bicycle having pedal actuated brakes wherein easily operated means are provided for releasing the brakes.

It is another object of the present invention to provide a bicycle having a handle bar rotatably shiftable between what is normally considered racing position and touring position which does not necessitate the utilization of hand tools for effecting such shifting with attendant travel stoppage.

Another object of the present invention is to provide a bicycle having a handle bar equipped at its end extremities with shift controls for disposing the drive chain between a selected drive sprocket and a driven sprocket for the desired ratio and which controls are operable in the same manner regardless of the position of the handle bar.

It is another object of the present invention to provide a bicycle having a stem which slopes upwardly and forwardly from the upper end of the front fork for reducing hazard to the rider in the event of accident as well as eliminating interference with the various flexible control cables for the brakes and gears.

DESCRIPTION OF THE DRAWINGS

FIG. 5 is a top plan view taken on the line 5—5 of FIG. 1.

FIG. 6 is a fragmentary side view taken substantially on the line 6—6 of FIG. 5.

FIG. 7 is a fragmentary side view similar to FIG. 6 illustrating the pawl in engaged position.

FIG. 8 is a front elevational view taken on the line 8—8 of FIG. 1.

FIG. 9 is a fragmentary side elevational view taken on the line 9—9 of FIG. 8.

FIG. 10 is a fragmentary top plan view taken in partial section on the line 10—10 of FIG. 8.

FIG. 15 is a vertical transverse sectional view taken on the line 15—15 of FIG. 13.

FIG. 17 is an enlarged side view taken on the line 17—17 of FIG. 16.

FIG. 18 is a vertical transverse sectional view taken on the line 18—18 of FIG. 12.

FIG. 19 is a fragmentary front view taken on the line 19—19 of FIG. 11.

DESCRIPTION OF THE PRACTICAL EMBODIMENTS

Figure 1:
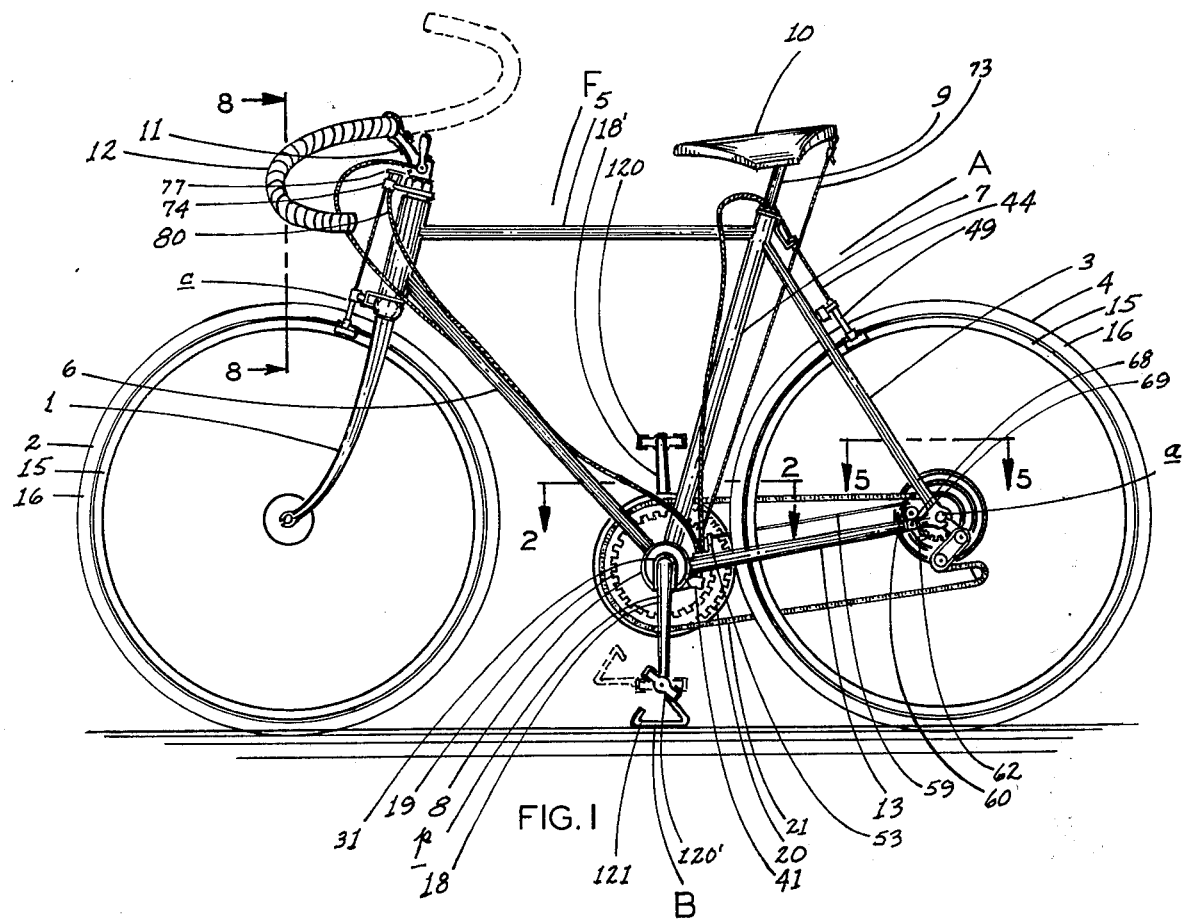
FIG. 1 is a side view of a bicycle having mounted thereon a pedal actuated brake constructed in accordance with the present invention.
Figure 2:
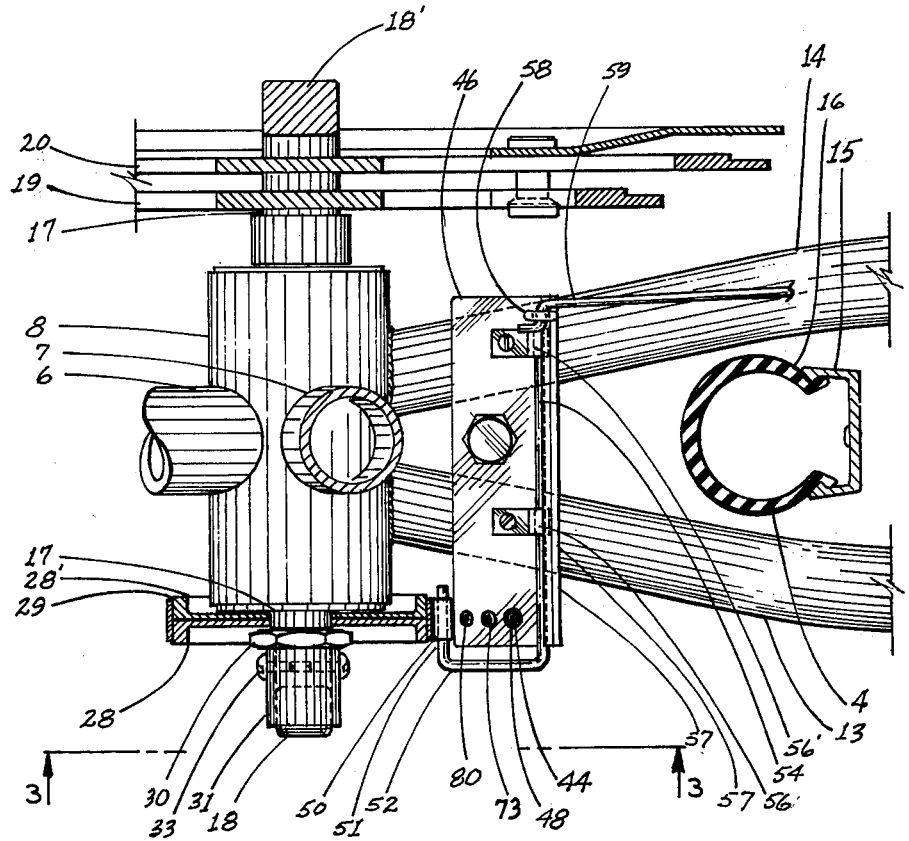
FIG. 2 is a fragmentary top plan view taken on the line 2—2 of FIG. 1.

Referring now by reference numerals to the drawings which illustrate practical embodiments of the present invention, A generally designates a bicycle including a frame F having a front fork 1 mounting a front wheel 2, a rear fork 3 mounting a rear wheel 4, with there being a cross bar 5 interconnecting said forks 1, 3. Said frame F also incorporates front and rear diagonal bars 6, 7, respectively, which at their lower ends merge into the usual hub 8. At its forward upper end, front diagonal bar 6 is integral with the upper portion of front fork 1, while the upper end of rear diagonal bar is unitary with the upper end of rear fork 3 and the rearward end of cross bar 5, with the customary extensible rod 9 being accommodated to support a seat 10. Carried upon the upper end of front fork 1 is a stem 11 for mounting handle bars 12. Diverging rearwardly from hub 8 are the usual rear support bars 13, 14 for the rearward axle a. Each wheel 2, 4, which is of the usual spoke-type, embodies the customary rim 15 for receiving a tire 16.

Hub 8 supports a shaft 17 of a pedal crank assembly, denoted generally p. Shaft 17 at each of its ends carries the usual pedal cranks 18, 18'.

For purposes of illustration herein, bicycle A is set forth as of the popular ten-speed type and thus is shown as having a pair of inner and outer drive sprockets 19, 20 secured upon hub shaft 17 between hub 8 and pedal crank 18'. Sprocket 20 which is laterally outwardly of sprocket 19, is of greater diameter. Provided for selected engagement about drive sprockets 19, 20 is the forward end portion of the usual endless transmission or drive chain 21. Said chain 21 is engageable about a predetermined driven sprocket of the customary cluster of five (5) driven sprockets, or so-called derailleur gears, mounted upon bicycle rear axle a in side-by-side relationship; said driven sprockets being indicated at 22, 23, 24, 25, 26 (FIG. 5), which are of respectively increasing diameter inwardly. Bicycle A thus embodies the usual system for interconnecting drive sprockets 19, 20 with driven sprockets 22, 23, 24, 25, 26 in a preselected manner to provide the desired gear ratio.

Mounted upon the hub shaft 17, between same and pedal crank 18' is a drum 27 comprised of a pair of shallow cups 28, 28' formed as from stampings and welded in back-to-back relationship, opening away from each other for establishing a circumferential peripheral surface 29. Drum 27 is secured upon said shaft 17 by means of an enlarged nut 30; with there being a U-shaped clamp 31 carried upon the proximate projecting end of said shaft 17; said clamp member 31 being secured, as by transversely aligned pairs of screws 33, 34, to a block 35 which carries on its inner face an inwardly extending projection 36 for reception within a recess 37 formed within drum 27 for effecting stable securement of the latter to the hub shaft for movement therewith.

Figures 3, 4:
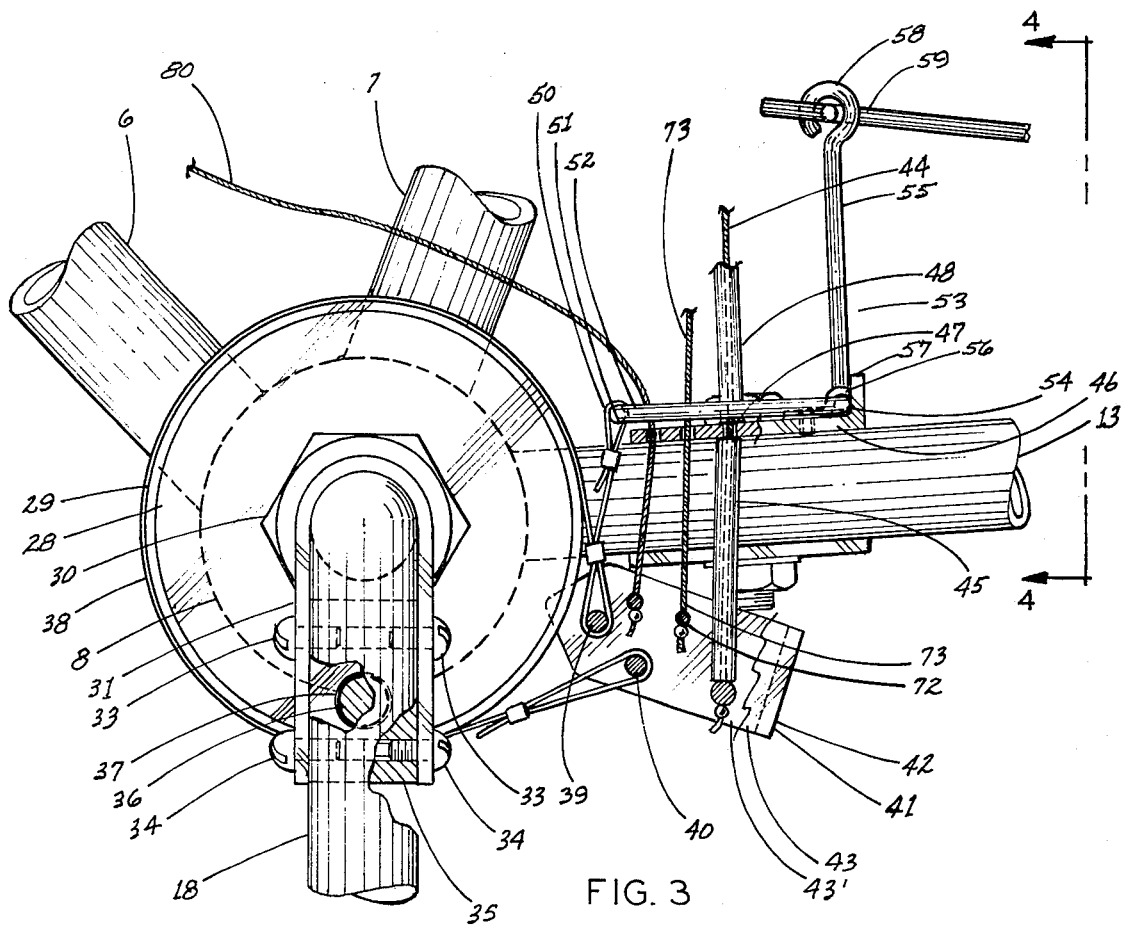
FIG. 3 is a side elevational view, in partial section, taken on the line 3—3 of FIG. 2.
FIG. 4 is a fragmentary vertical view taken on the line 4—4 of FIG. 3.

Disposed about the periphery 29 of drum 27 is a band 38, as of stainless steel or the like, having its opposite, upper and lower end portions looped for respective reception about pins 39, 40, provided upon a U-shaped mounting member or lever 41. Said mounting member 41 comprises a rearward web 42 and forwardly extending parallel arms 43, 43' with their forward end extremities on opposite sides of the adjacent portion of drum 27 (see FIG. 3). Said pins 39, 40 thus extend transversely between said arms 43, 43' being fixed at their ends therein. U-shaped member 41 is connected to the lower end of a rear wheel brake control cable 44 which extends upwardly through a compression sleeve or spacer 45, the upper end of which limits against the under face of a plate 46 mounted upon the adjacent portions of frame elements 13, 14 immediately rearwardly of hub 8. Said cable 44 extends upwardly through an opening 47 in said plate 46 and continues through a flexible sleeve 48 for ultimate connection to conventional rear brake calipers 49 for engaging the rim 15 of rear wheel 4. The upper end extremity 50 of band 38 projects upwardly from the loop portion about pin 39 for engagement about a finger 51 provided at the forward end of a longitudinally extending leg 52 of a bell crank type rod, designated generally 53; said leg 52 at its rearward end being continuous with a transverse leg 54, constituting a fulcrum or pivot axis, and which at its end remote from said longitudinal leg 52 is integral with a vertical arm 55 axially normal to transverse leg 54. Transverse leg 54 is journalled within bearings 56, 56' fixed upon plate 46, which latter embodies an upstanding transversely extending rearward flange 57 against which said transverse leg 54 limits. At its upper end vertical arm 55 is contoured to provide a hook 58 for engaging the forward end of a pull link 59, which latter extends rearwardly for securement to the upper end of a leaf spring 60 which in its lower portion is fixed, as by a screw 61, to the forward face of a pawl 62 having, on its rearward face, upper and lower tongues 63, 64, respectively, adapted to engage opposite sides of adjacent teeth, as at 65, 65', of sprocket 26. Said pawl 62 is fixed upon a pin 66 which is pivotally received within a mounting plate 67 secured as by a bolt 68 to a companion plate 69 on the opposite side of the intervening frame element 14. Mounting plate 67 contains in its lower rearward portion a laterally, outwardly turned finger 70 receivable within a recess 71 formed in said frame member 14 whereby unauthorized displacement of plate 67 together with pawl 62 is prevented so as to assure of its positionment for engaging sprocket 26.

In operation of bicycle A, drum 27 will move freely of band 38 during forward travel of the bicycle so that there will be no untoward interference with movement. When it is desired to apply the brakes, the operator will exert a back pressure upon the pedals, that is, back pedal, and upon the imposition of such pressure, band 38 will be brought into gripping engagement with the periphery 29 of drum 27 thereby effecting a downward pulling upon pin 39 which will, in turn, cause a downward rocking of U-shape member or lever 41 and a downward pull upon bell crank 53 by reason of the downward force acting upon finger 51. Such action will result in vertical arm 55 being tilted forwardly and thereby bring about a forward pull upon link 59 causing a rocking of pawl 62 to bring its tongues 63, 64 into engagement with the proximate teeth 65, 65' of driven sprocket 26 as may best be seen in FIG. 7. As will be shown, this action occurs prior to the application of the brakes so that an accumulation of slack in transmission chain 21 between the particular drive sprocket 19 or 20 and the preselected driven sprocket of the cluster is assured. Thus, the present invention is designed to restrict the back pedaling movement of the sprocket cluster on rear axle a in advance of actually applying the brakes, such as gripping by calipers 49, so that when the brakes are ultimately released, there will be slack in chain 21 available for permitting turning of the hub axle 17 before the wheels turn. Without such slack, the upper course of transmission chain 21 would become taut and remain taut despite release of the brakes so that despite releasing the brakes, the wheels could not turn upon forward pedaling in view of the absence of such slack.

Sequentially to accumulation of the chain slack as above described, by reason of the downward rocking of U-shaped member 41 in its rearward portion, a tension will be effected upon brake control cable 44, pulling same downwardly and thereby removing the upper end of compression sleeve 45 from contact with the under face of plate 46. Cable 44 will thus cause rear brake calipers 49 to engage the bicycle rear wheel 4 for braking purposes. When it is desired to resume forward travel, and thereby release the back pressure on the engaged drive sprocket 19 or 20, as the case may be, the accumulated slack, as described, permits the hub axle 17 to turn in advance of turning of the bicycle rear wheel 4 so that forward travel may be continued until such time as the brake is again applied. With release of tension upon cable 44, U-shaped member 41 will rock slightly upwardly in its rearward portion into its normal condition (see FIG. 3). Bell crank 53 is restricted by flange 57 to assure of its proper location and operation by virtue of the engagement between band 38 and drum periphery 29. Any rearward rocking of vertical arm 55 would, of course, be of no significance as the same would only serve to assure that pawl 62 was not prematurely engaged. With the upward, return rocking of U-shaped member 41 the binding engagement between band 38 and drum periphery 29 is lost and thus bell crank 53 is permitted to return to rearward position and cause release of the pulling force on pawl 62 so that the latter may be removed from engagement with sprocket 26.

Fixed at its lower end to U-shaped member 41, as at 72, is a release cable 73, the upper end of which is secured at a point proximate bicycle seat 10 for convenience of operation. When the operator desires to move the bicycle backwardly, and to avoid the application of the braking system, he merely initially pulls upwardly on release cable 73 thereby causing U-shaped member 41 to be rocked upwardly at its forward end and hence prevent restrictive engagement between drum periphery 29 and band 38 so that the brakes will not be applied while the bicycle is being rolled rearwardly. Cable 73 may be also used for pushing the left hand side pedal forwardly prior to mounting in order to effectively locate the support stand, indicated generally at B.

In recapitulation, it will be seen that when drum 27 is caused to rotate rearwardly through back pedaling, a binding effect upon band 38 will be brought about whereby pin 39 will cause U-shaped member 41 to be slightly canted downwardly and rearwardly with a concurrent tension upon cable 44, and, conversely, when release cable 73 is pulled, it will have a lifting effect upon U-shaped member 41 effecting disengagement between band 38 and drum 27 to prevent binding or braking action to allow for rearward rolling of the bicycle as well as positioning of support stand B.

With regard to the braking action of front wheel 2, there is provided a hand lever 74 located downwardly of the bicycle handle bars 12 and which at its left-hand end, as at 75, is pivoted by a pin 76 upon a bracket 77 fixed upon the steering column portion of front fork 1. Thus, lever 74 is free at its normally bicycle right-hand end so that the operator by lifting upwardly on such end, that is, drawing said lever end toward said handle bar 12 (see phantom lines FIG. 8) will cause a pivoting about fulcrum pin 76 with the same effecting a lifting upon a cable 78 attached at its upper end to a plate 79 carried on lever 74; which cable 78 at its lower end is engaged in conventional manner to front wheel caliper brakes, as indicated at c.

Also fixed to U-shaped member 41 is the lower, rearward end of a cable 80 which proceeds forwardly and upwardly within a sleeve 81 which latter at its upper end abuts against the under face of plate 79 between fulcrum pin 76 and the point of attachment of cable 78, as at 82. Cable 80 projects upwardly beyond the upper end of sleeve 81, through an opening 83, for securement at its upper end to an extension 84 of bracket 77 (see FIGS. 8 and 9). Thus, sleeve 81 upon rocking of U-shaped member 41 downwardly in its rearward portion, will cause a pushing upwardly against plate 79 and, hence, against lever 74 for actually causing upward swinging of the same into brake-applied condition.

In actual operation it will be seen that the front wheel brake c will be applied in sequence to the application of the rear wheel brakes and such is accomplished by causing the calipers of the front wheel brakes, c to be spaced slightly further apart so that during closing action it will take a slightly greater time to effect braking action with wheel 4, but with such delay being compensated by a more rapid gripping than would normally occur by reason of sleeve 81 pushing upwardly against plate 79 and, hence, causing lever 74 to assist in the effective upward pull on cable 78 to apply brakes c. The force applied by sleeve 81 is proximate fulcrum pin 76 so that the same will bring about a more rapid action during the latter part of the braking stroke. It must also be noted that as the weight of the rider comes onto the front wheel during the braking action there is an application of more weight on front wheel 4 so that actually a greater braking action is effected in said front wheel 4.

Referring now to FIGS. 11 through 19, A' designates a bicycle which is fundamentally similar to bicycle A above described, but which incorporates another arrangement for slackening the upper course of the transmission chain when the brakes are applied, as well as for engaging the caliper remote ends of the brakes; which bicycle also embodies novel handle bar shifting structure. Components of bicycle A' which are of like construction as corresponding components in bicycle A will bear the same reference numerals.

Figure 13:
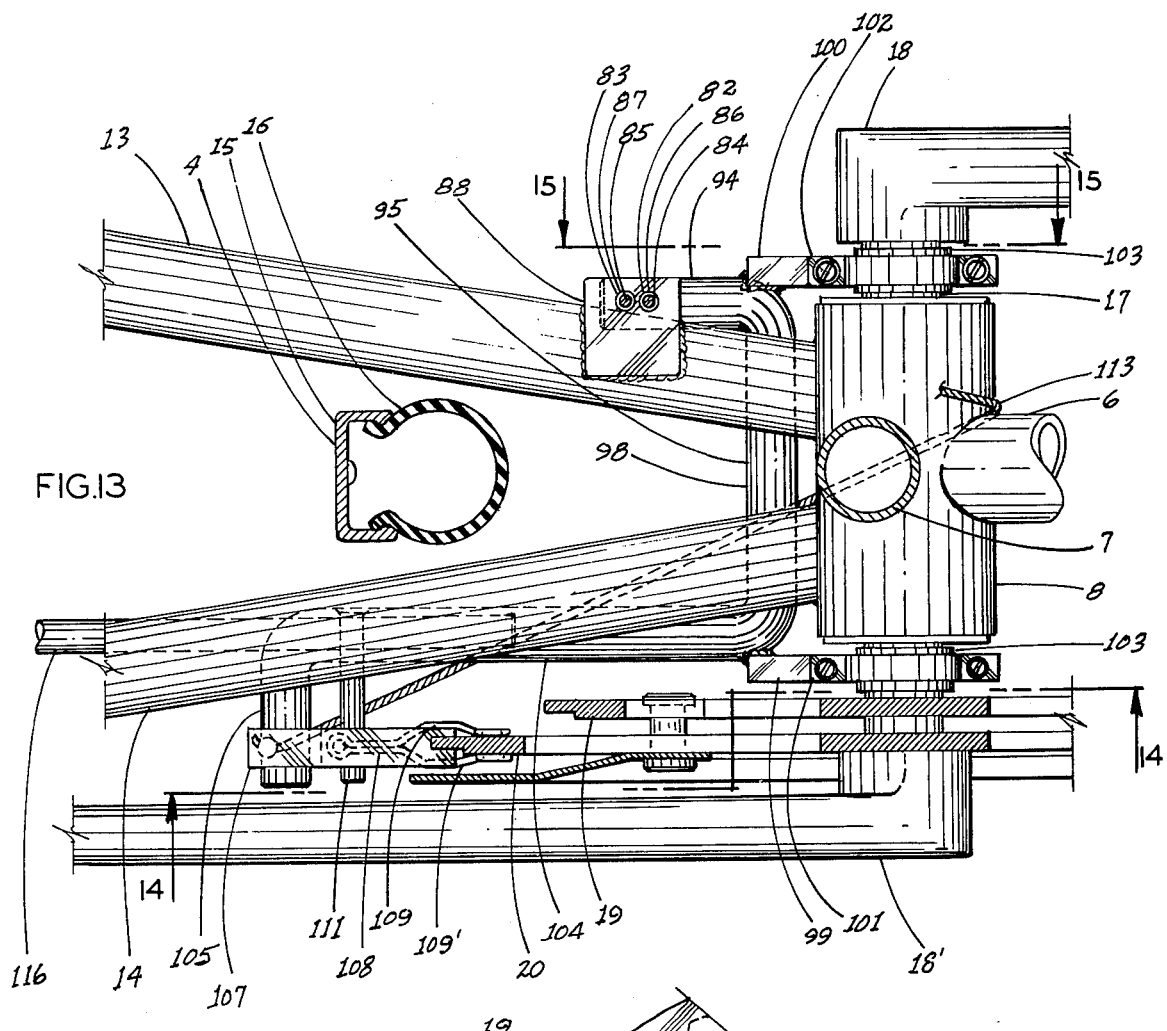
FIG. 13 is a horizontal transverse sectional view taken on the line 13—13 of FIG. 11.

Front and rear brake calipers c, 49, respectively, are connected to front and rear cable assemblies 82, 83, respectively, which comprise elongated flexible inner cores or pull cables 84, 85, respectively, disposed within flexible outer casings 86, 87, respectively, which latter at their rearward or caliper-remote ends are rigidly fixed upon a flat, relatively small, horizontally disposed plate 88 affixed to axle support bar 13 (FIG. 13). Said plate 88 is provided with openings 89, 90 aligned with casings 86, 87, respectively, through which the pull cables 84, 85 extend downwardly for projection through registering apertures 91, 93, respectively, formed in one leg 94 of a rearwardly opening U-shaped lever 95 formed, as of rod stock. On their lower projecting ends, each pull cable 84, 85 mounts a detent 96, 97, respectively, for anchoring.

The central portion 98 of lever 95 extends transversely of bicycle A' and at its ends is fixed to extensions 99, 100 of bearing blocks 101, 102, respectively, which are of the split type and engaged upon hub shaft 17 immediately adjacent the ends of hub 8. Each bearing block 101, 102 is provided with a nylon bushing 103 for facilitating installation. As will be shown more fully hereinbelow, there is no load applied upon bearing blocks 101, 102 except when the bicycle brake assemblies c, 49 are applied. The remaining leg 104 to lever 95 extends rearwardly in underlying relation to the forward portion of axle support 14; being of substantially greater length than lever leg 94, and at its rearward end is turned laterally outwardly to define a short arm 105, the outer extremity of which projects slightly beyond drive sprocket 20 and being spaced rearwardly thereof. Engaged upon the outer end of arm 105 by a pivot pin 106 for rockable movement is the base of a forwardly extending pawl 107 of suitable length and contour for engaging the teeth, as at t, of drive sprocket 20 for purposes presently appearing. Mounted on the forwardly directed face of pawl 107 immediately upwardly of arm 105 is the rearward end of a forwardly projecting spring 108 which is of hair pin shape, having opposed arms 109, 109' for frictionally engaging opposite side faces of drive sprocket 20. The base of pawl 107 has integrally formed therewith a forwardly extending finger 110 for abutting engagement with a stop pin 111 fixed in the adjacent portion of lever arm 104 and projecting laterally therefrom; whereby through such engagement the upward rocking movement of pawl 107 is limited.

Figure 14:
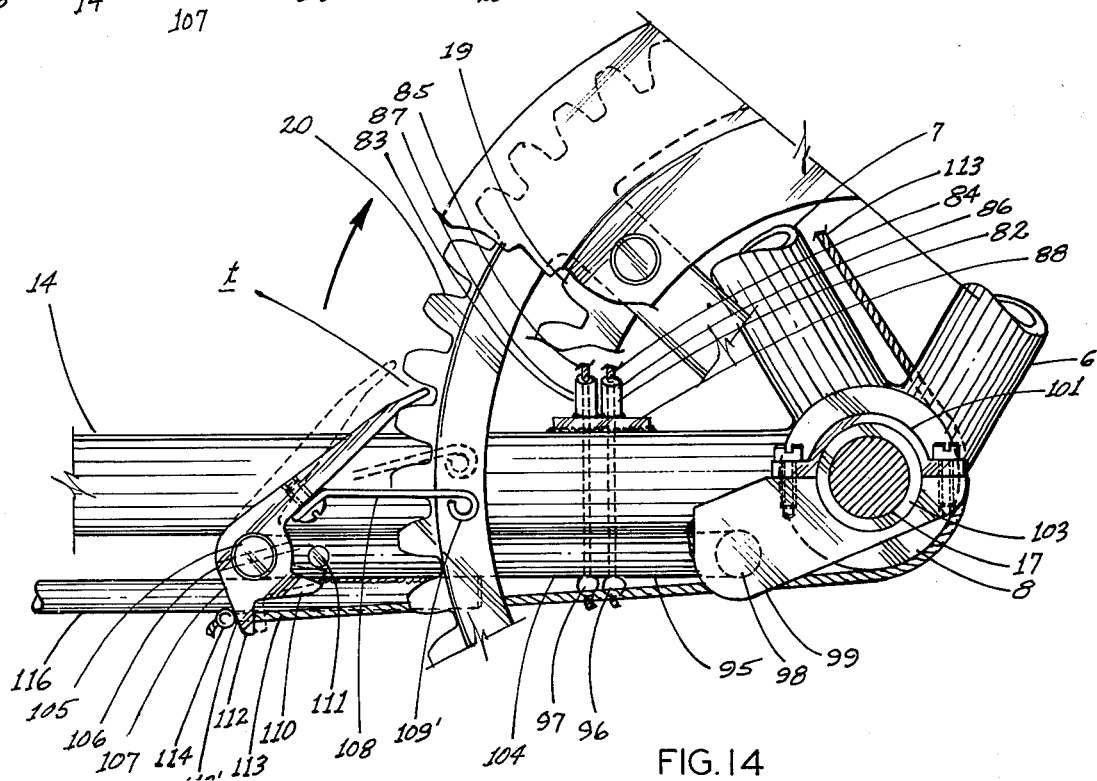
FIG. 14 is a vertical transverse sectional view taken on the line 14—14 of FIG. 13.
Figure 16:
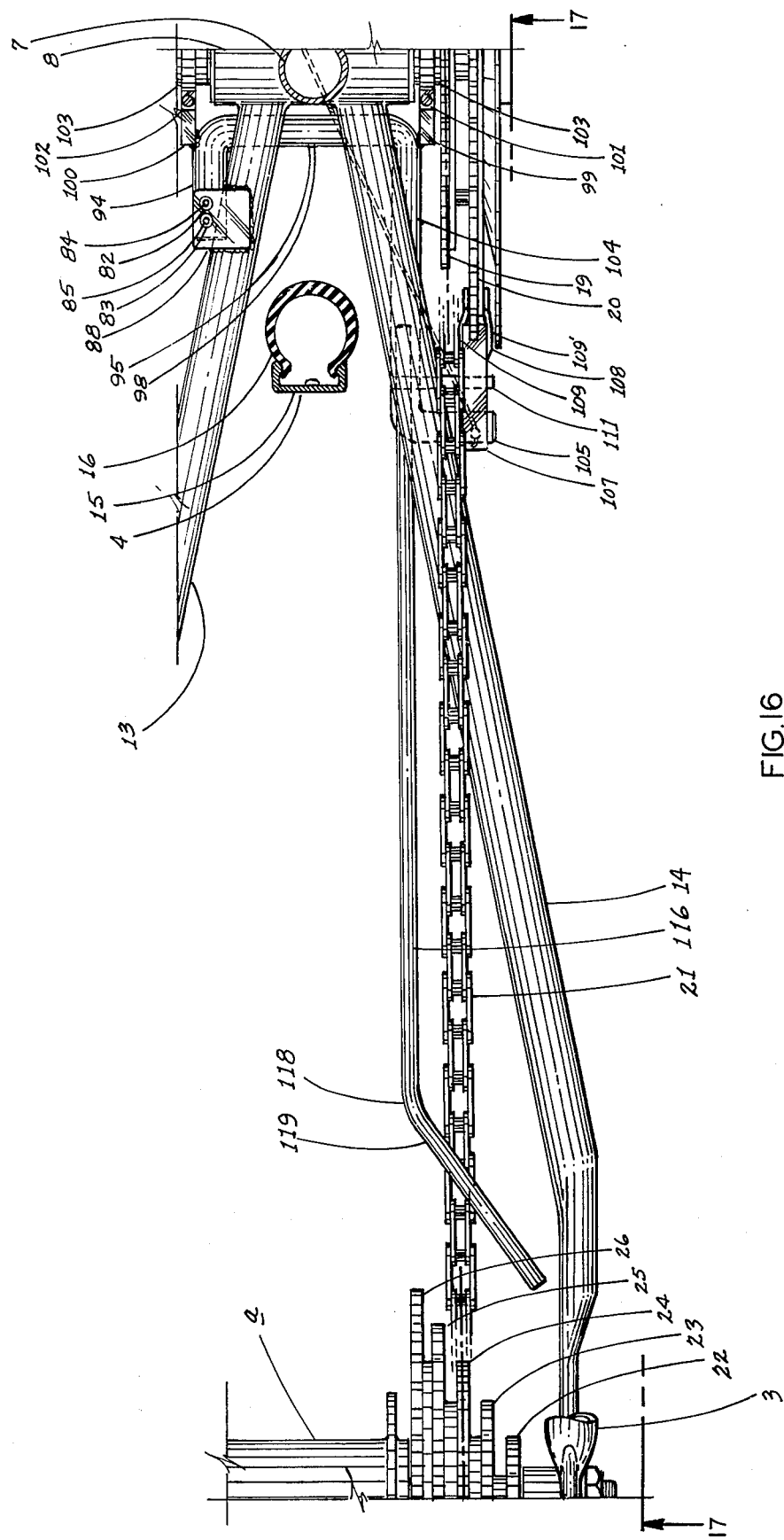
FIG. 16 is a top plan view taken on the line 16—16 of FIG. 11.
Figure 20:
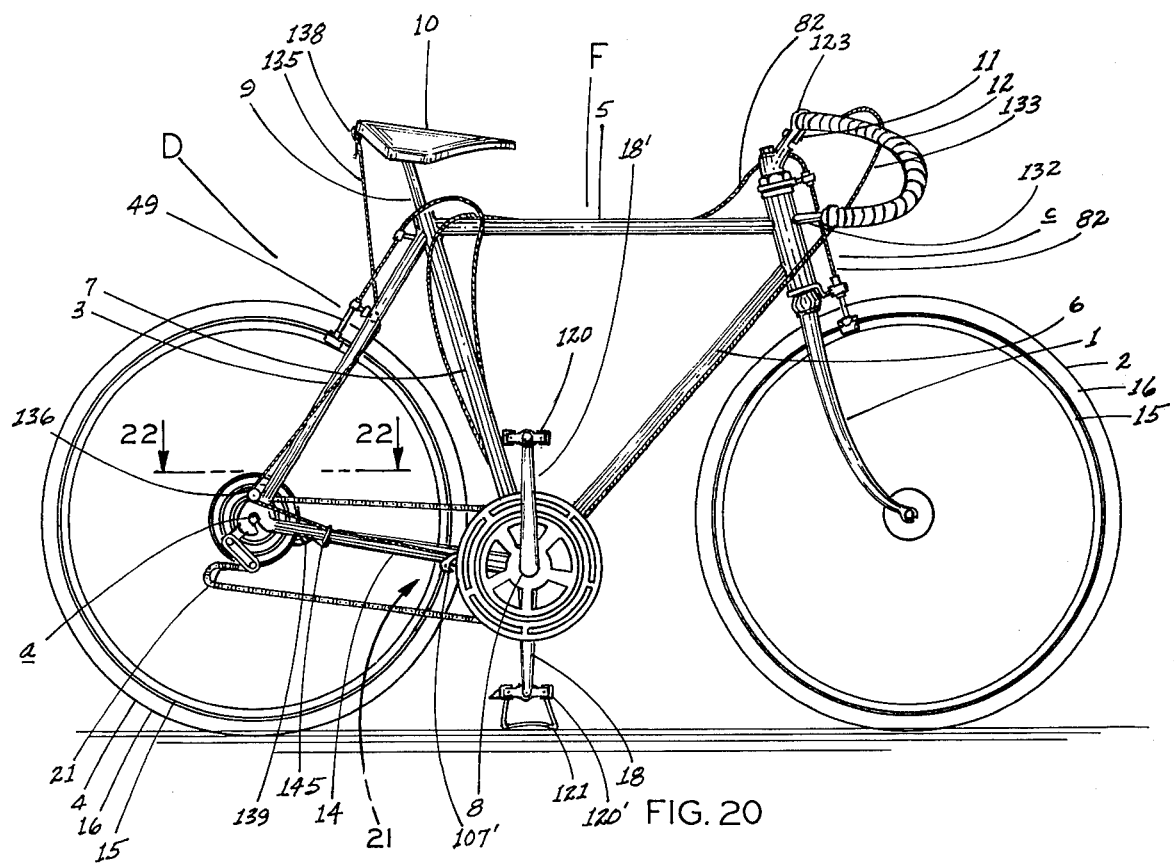
FIG. 20 is a side elevational view of a bicycle incorporating another form of pedal actuated brake constructed in accordance with and embodying the present invention.
Figure 21:
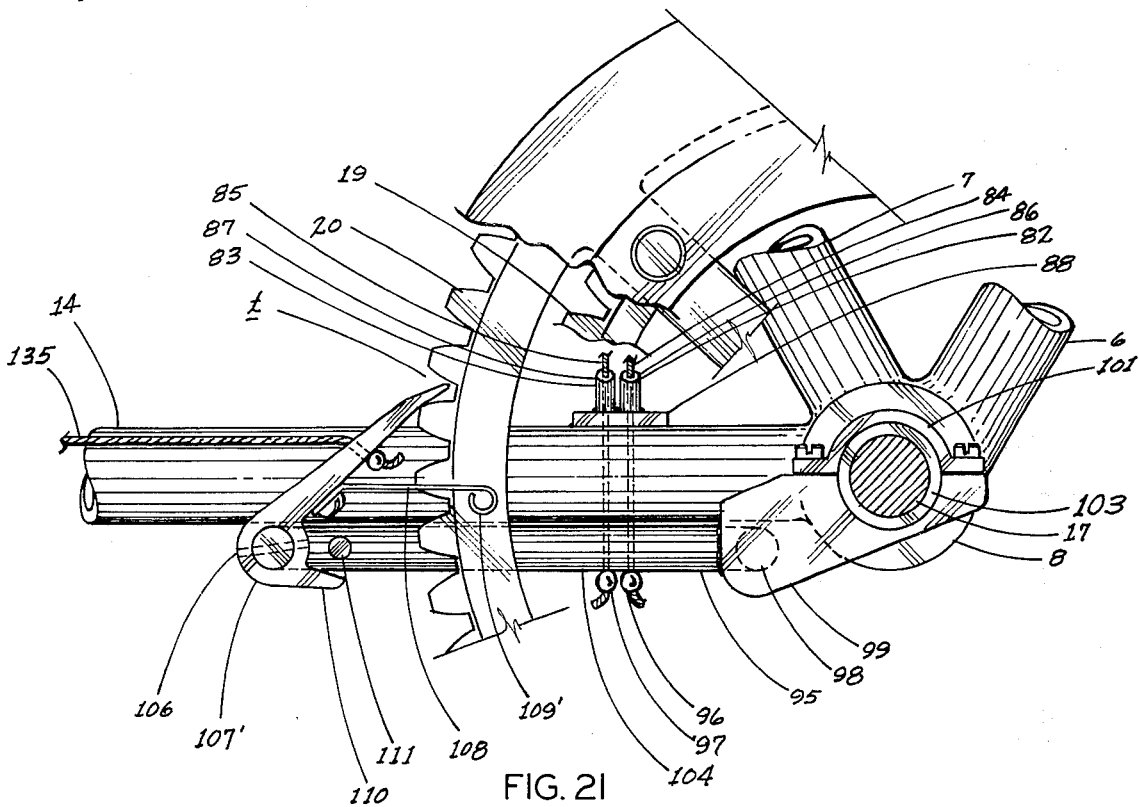
FIG. 21 is an enlarged side view partially broken away taken at the arrow in FIG. 20.
Figure 22:
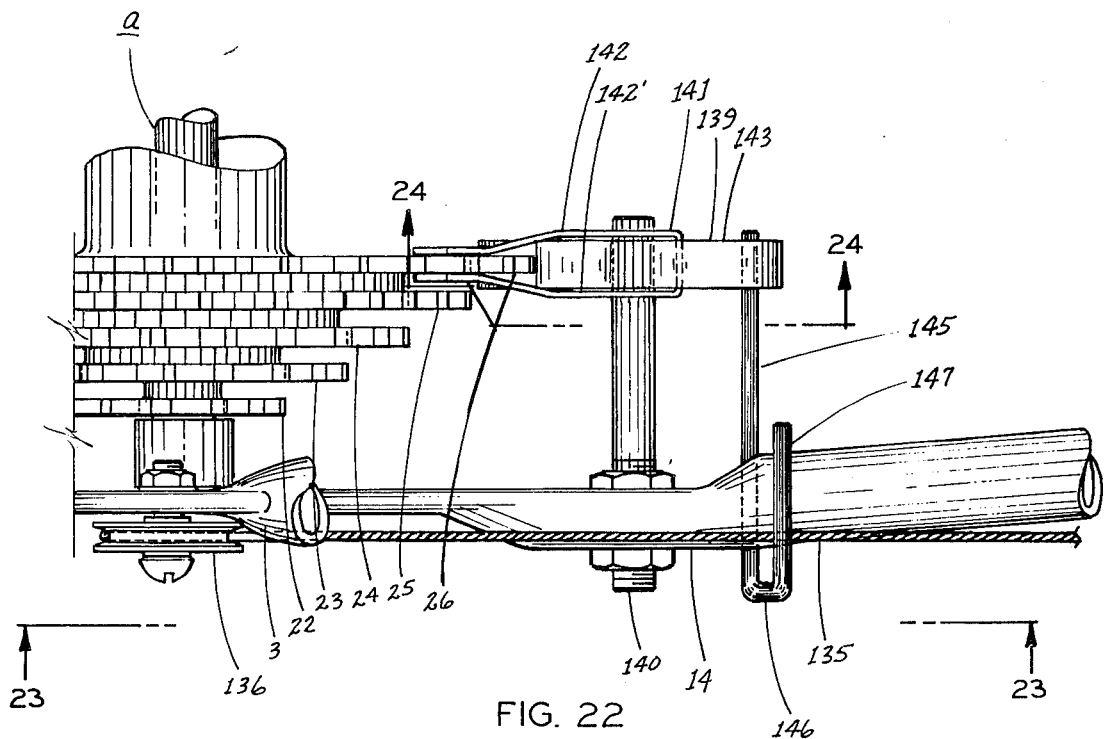
FIG. 22 is a top plan view taken on the line 22—22 of FIG. 20.

It will thus be seen that when bicycle A' is moving forwardly, drive sprocket 20 will rotate in a clockwise manner as viewed in FIG. 14 and as indicated by the arrow. Such travel will drag the engaged arms of spring 108 upwardly, as into the position indicated in phantom lines in FIG. 14, which movement will cause pawl 107 to rock rearwardly as into the position shown in phantom lines in FIG. 14 wherein it is clear of teeth $t$ and, hence, causes no obstacle to the rotation of drive sprocket 20. Conversely, should the operator effect a back-pedaling action, causing drive sprocket 20 to rotate in a counterclockwise direction as viewed in FIG. 14, spring 108 will be, as it were, dragged downwardly as into the position shown in full lines in FIG. 14, which, in turn, pulls pawl 107 rockingly forward for interposition between adjacent teeth of said sprocket 20. The significance of this action will be discussed more fully below.

Pawl 107 also is provided with a depending boss 112 at its lower end having an aperture 112' through which extends the lower end of a control cable 113 with there being an enlarged detent 114 on its end extremity for engaging the rearward face of boss 112. Said cable 113 progresses from boss 112 forwardly and inwardly beneath lever 95 and hub 8 and, thence, is directed upwardly about said hub 8 and rearwardly and upwardly therefrom to a convenient point upon bicycle seat 10, as at 115, for convenience of manipulation by the user.

From the foregoing it will be seen that with bicycle A' in forward motion, pawl 107 is removed from engagement with drive sprocket 20 so that there is no inhibiting action upon hub shaft 17. However, when the operator wishes to stop, a back pedaling action is undertaken and, as explained above, pawl 107 is brought forwardly for disposition within an interdental space within drive sprocket 20 thereby inhibiting rotation of shaft 17. The force applied upon drive sprocket 20 by virtue of such back pedaling movement is transmitted by the engaged pawl 107 to lever 95 which is rocked slightly downwardly with the bearings 101, 102 being thus swung counterclockwise as viewed in FIG. 14. Such downward rocking of lever 95 effects a downward pulling action upon cables 84, 85 whereby front and rear brake assemblies $c$, 49 are actuated for effectively braking said front and rear wheels 2, 4, respectively.

When the operator desires to resume forward travel, an upward drawing upon cable 113 in its portion adjacent seat 10 will pull pawl boss 112 forwardly, thus rocking pawl 107 rearwardly from engaged condition with drive sprocket 20 and thereby freeing sprocket 20 and, hence, shaft 17 for rotation, while concurrently releasing the stress upon lever 95 so that bearings 101, 102 may be returned to normal condition.

From the foregoing, it will be seen that a unique system is provided for effecting braking action upon the bicycle wheels by mere pedal movement, thus obviating the need for the operator having to manipulate hand controls. Should the user wish to free drive sprocket 20 to allow backing of the bicycle or for resuming forward travel, a slight tugging is all that is required upon cable 113, adjacent seat 10, to release pawl 107 and restore lever 95 to normal condition.

The system thus described would be equally effective with bicycles of the usual single and three-speed types.

However, with bicycles of the ten-speed type, it has been found that with the relatively increased leverage developed through the present invention, the brakes tend to stick or lock when excessive foot pressure is applied. The reason for this is that the free wheeling unit customarily incorporated in the driven or rear sprockets 22, 23, 24, 25, 26 allows the top course 21' of the transmission chain 21 to remain taut so that when the operator starts to pedal forward, subsequent to lifting pawl 107, chain 21 will tend to turn rear wheel 4 which was locked while back tracking on the braking stroke. A slackness in chain 21 is required to permit of the forward pedal movement before movement of the rear wheel.

Fixed, as by brazing, to lever 95 in the rearward end zone of leg 104 is the forward end portion of an elongated rigid finger 116, as of spring steel wire or rod stock for extension rearwardly therebeyond. Said finger 116 in its major extent is located inwardly and beneath rear axle support 14 and spacedly inwardly of transmission chain 21 (see FIG. 16). At a point 117 spaced from its rearward end extremity finger 116 is bent for extension rearwardly and upwardly to a point, as at 118, above chain 21 and from said point 118 is then formed to present an end arm portion 119 which extends laterally, rearwardly, and downwardly; being of sufficient length to overlie chain 21 without respect to which of the driven gears 22, 23, 24, 25, and 26 may be engaged (see FIG. 16).

It will be seen that when the rider back pedals causing the engaged drive sprocket to turn counterclockwise, pawl 107 will be brought into engagement with teeth $t$ for inhibiting rotation of shaft 17 and for applying brake assemblies 79, 49 as above described. However, with the downward rocking of lever 95 consequent to the swinging of bearing blocks 101, 102 finger 116 will be commensurately lowered whereby end arm portion 119 is brought into engagement with chain 21 causing the application of a force thereon adequate to prevent same from becoming taut. Thus, finger 116 serves in the capacity of what one might consider a "slack maker" so that upon release of the brake assemblies, the engaged drive sprocket, 19 or 20, as the case may be, is not restrained from movement.

Mounted upon pedal cranks 18, 18' in a conventional manner are foot pedals 120, 120', respectively. Upon left pedal 120' is engaged a bicycle support stand 121 which, by virtue of its disposition upon said pedal, causes same to swing when the operator's foot is removed so as to present said stand 121 downwardly into position for surface engagement. Said stand is the type generally disclosed in my copending patent application Ser. Nos. 335,699 and 403,168. As the pawl 107 prevents pedal cranks 18, 18' from moving backwardly without applying the bicycle brakes, pedal crank 18' need not be in straight down position for effectively presenting stand 121 to the support surface, but may be within the zone adjacent thereto.

Figure 11:
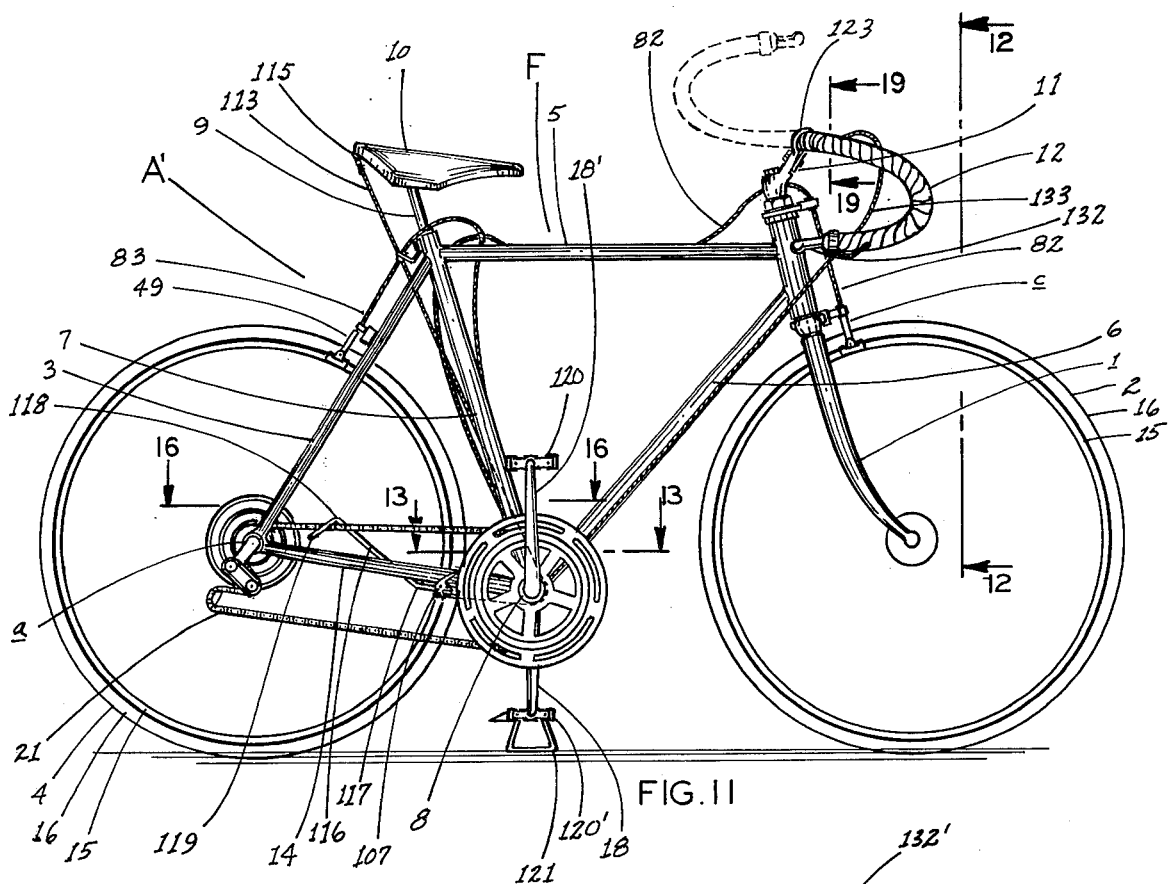
FIG. 11 is a side elevational view of a bicycle incorporating a pedal actuated brake constructed in accordance with and embodying the present invention, said bicycle also incorporating a handle bar and associated structure conforming to the present invention.

Handle bar 12 is of the standard racer type and being shown in full lines in FIGS. 1 and 11 in the normal racing position, wherein the end portions are downwardly of stem 11, while the position shown in phantom lines in said FIGURES, is obtained by revolving handle bar 12 through an angle of 180° and represents the touring, or more restful position. The central portion of handle bar 12, as at 122, extends through a sleeve 123 formed at the upper forward end of stem 11. In its under portion, sleeve 122 is provided with an inward projection in the nature of a detent 124 while in its opposed portion is formed to provide a shoulder or stop 125; and with there being a groove 126 formed on the innerface of said sleeve 123 and extending between detent 124 and shoulder 125. Received within groove 126 is the end of a limit pin 127 which is disposed within a casing 128 extending diametrally of handle bar portion 122, with there being a spring 129 in the base of casing 128 for urging limit pin 127 outwardly toward the inner face of handle bar sleeve 123 for snug reception within groove 126. Thus, detent 124 and shoulder 125 determine the extent of travel of limit pin 127 and, hence, of the arc of rotation of handle bar 12 within said sleeve 123. Pin 127 acts as a detent, as well as a limit since it will effect a stressful condition with detent 124 and shoulder 125 in order that handle bar 12 will be firm in either of its two positions and will require an extra effort at the initiation of a change of position. Sleeve 123 is also provided with a tapped opening 130 for receiving a threaded closure plug 131. The said opening 130 is of sufficient diameter to permit of passage therethrough of pin 127 and spring 129 for installation or replacement purposes. Thus, the foregoing arrangement allows for facile transposition of handle bar 12 between its racing and touring positions without requiring the user to operate a hand tool or the like and thereby permitting such transposition without interruption of travel. In either of its positions, handle bar 12 is firm by reason of the unique relationship of spring biased pin 127 and detent 124 and shoulder 125.

With reference to FIGS. 1, 11 and 18, it is to be seen that stem 11 projects upwardly and forwardly from the upper end of front fork 1, being thus normally inclined to the vertical and thereby displacing handle bar 12 from overlying relationship to the upper end of front fork 1 as is customary in current bicycles. By virtue of having stem 11 slope upwardly and forwardly, away from the rider, there is obviated the potential for injury to the rider should he be thrown forwardly as would be likely with bicycles wherein the stem is substantially vertical. It will be seen that the axis of stem 11 is approximately 45° to the axis of the upper portion of front fork 1.

Figure 12:
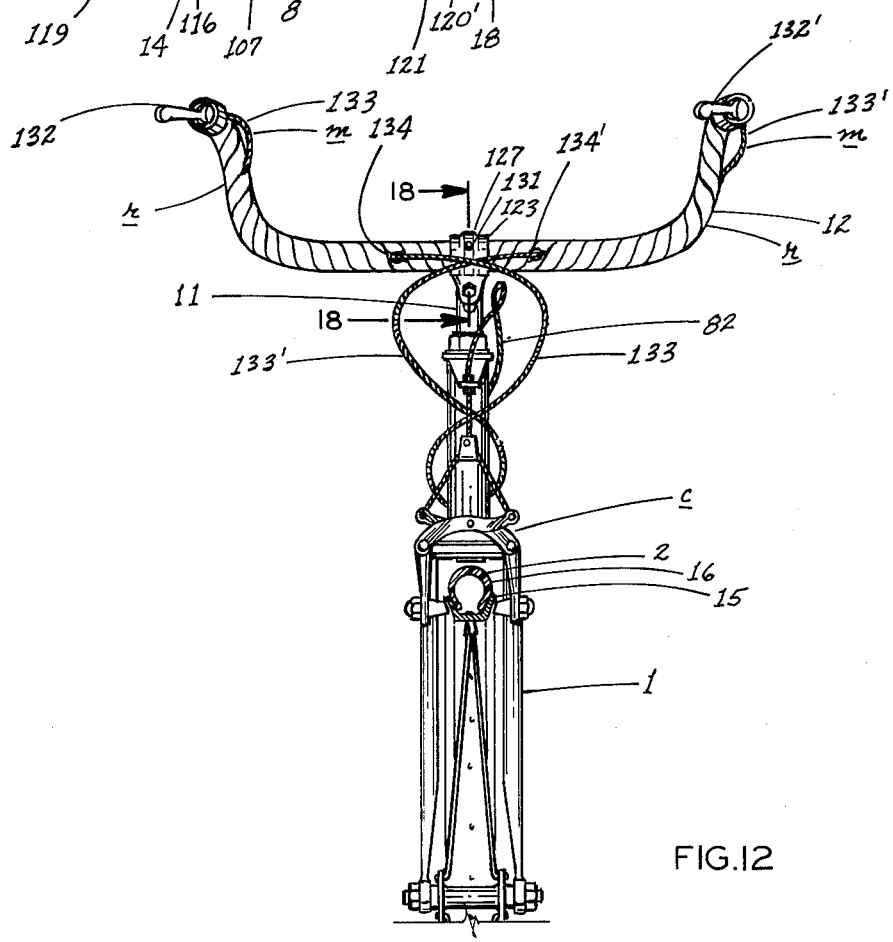
FIG. 12 is a front elevational view in partial section taken on the line 12—12 of FIG. 11.

Fitted into the ends of handle bar 12 are shift controls 132, 132'. The rider will move shift control 132' on the left end of handle bar 12 to the left or laterally outwardly to shift transmission chain 21 from drive sprocket 20 to drive sprocket 19 for placing the bicycle in a lower gear. the rider may move shift control 132 on the right end of handle bar 12 to the left, or, in this case, laterally inwardly, to move transmission chain toward the larger diameter driven sprockets of the rear cluster for changing to a lower gear. It will be seen that shift control 132' operates chain 21 between the drive sprockets while shift control 132 effects shifting of chain 21 between the driven sprockets; with the movement of said controls 132, 132' to the left of bicycle A' for purposes of obtaining a lower gear and, conversely, to the right for obtaining relatively higher gear ratios. It will be seen that regardless of whether handle bar 12 is in racing position or touring position the said controls 132, 132' will be moved in the same directions for the same purposes. With current bicycles, said controls are located proximate the upper end of front fork 1 and not upon the handle bar, and require an up and down movement for operation. With present invention, the said controls 132, 132' are installed at an angle of roughly 90° from the usual position so that the same will be operable in the identical manner with each position of handle bar 12. Also as shown in FIG. 12 shift control cables 133, 133' which are respectively engaged to controls 132, 132' are exposed in their portions immediately adjacent the respective shift controls 132, 132', as at $m$, and then are presented against handle bar 12 and taped over as by tape $r$ until the same extend outwardly through an opening 134, 134' on opposite sides of stem sleeve 123 in the central zone of handle bar 12. From the foregoing it will be seen that shift controls 132, 132' are so located that the rider's hands need never lose contact with handle bar 12 for the purpose of shifting gears, and with such controls being operable in the same manner for either the racing or touring position of handle bar 12 above stated. The angled stem 11 provides added safety in case of accident and may be relatively lowered since the customary shift levers are not engaged thereon. Furthermore, the disposition of said stem 11 obviates any interference with the various cables.

Referring now to FIGS. 20 through 26, D designates a bicycle which is substantially similar to bicycle A' above described, but which incorporates another arrangement for slackening the upper course of the transmission chain when the brakes are applied. Components of bicycle D which are of like construction as corresponding components in bicycle A' will bear the same reference numerals.

Bicycle D embodies a drive sprocket-engaging pawl 107' which is structurally fundamentally the same as pawl 107 above described, and cooperates with drive sprocket 20 in the same manner as pawl 107, but is devoid of a boss at its lower end, and is engaged in its upper end portion to one end of a control cable 135 which progresses rearwardly for training about a pulley 136 located above rear axle $a$ and supported upon a mounting 137 fixed to the bicycle frame F. Said cable 135 is directed upwardly from pulley 136 for suitable connection, as at 138, to bicycle seat 10 for ready accessibility to the rider. For providing slackness in transmission chain 21 for the purposes above described, bicycle D is also provided with a rear pawl 139 pivotally mounted on one end of a pin 140, the opposite end of which is rigidly secured to axle support 14 for extension laterally inwardly therefrom; said pawl 129 being presented in alignment with large driven sprocket 26 for engagement between the teeth $t$ thereof. Pawl 139 extends downwardly from its pivot point and substantially intermediate its length mounts a hair pin type leaf spring 141 having opposed arms 142, 142' for frictionally lightly gripping opposite faces of the base of sprocket 26. Thus, when driven sprocket 26 is rotated in a clockwise direction, as viewed in FIG. 23, during forward travel of bicycle D, spring arms 142, 142' will be slightly dragged downwardly causing pawl 139 to be rocked forwardly at its lower end and, hence, clear of engagement with said sprocket teeth $t$. Conversely, when driven sprocket 26 is caused to rotate in a counterclockwise direction, as viewed in FIG. 23, spring arms 142, 142' will be pulled upwardly through friction and thereby cause pawl 139 to swing rearwardly into engagement between adjacent teeth $t$ of sprocket 26 for inhibiting rotation of axle $a$ when the brakes are applied. Pawl 139 is provided with a forwardly projecting arm 143 to which is secured, as by a screw 144, the inner end of a spring 145 as formed of wire stock and progressing laterally outwardly from pawl 139 beneath axle support 14 whereat the same is bent returningly upwardly in bight formation, as at 146, for developing a laterally inwardly extending relatively short leg 147 spaced above axle support 14 a sufficient distance to avoid contacting same during swinging movement of pawl 139.

Figure 23:
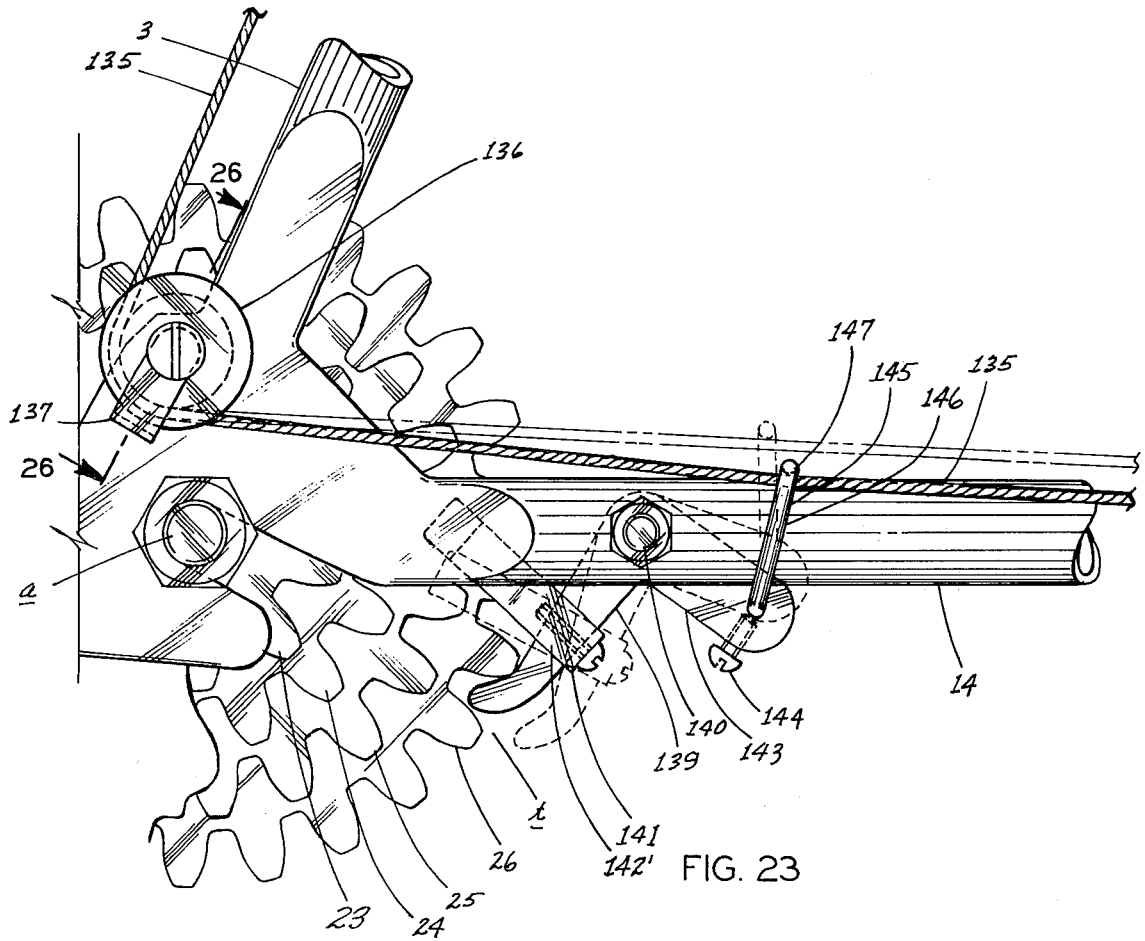
FIG. 23 is a side view taken on the line 23—23 of FIG. 22.
Figure 24:
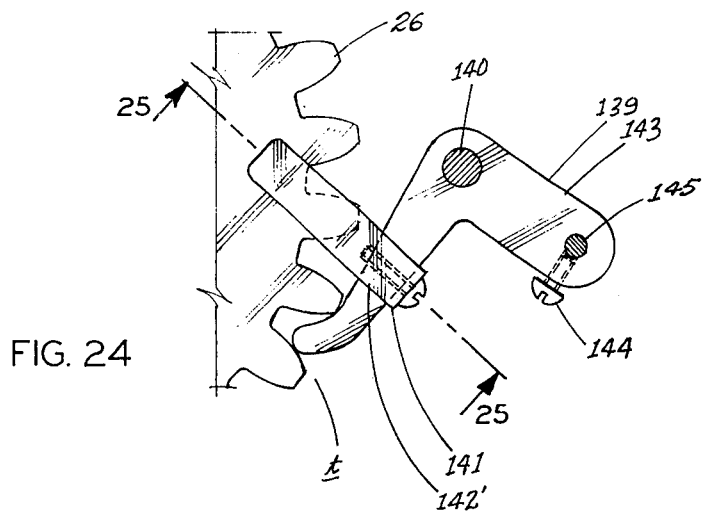
FIG. 24 is an enlarged view of the driven-sprocket-engaging pawl.
Figure 25:
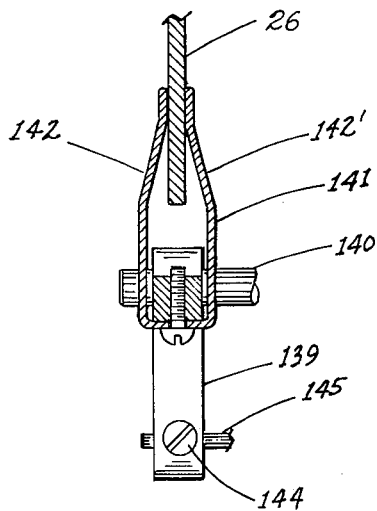
FIG. 25 is a horzontal transverse sectional view taken on the line 25—25 of FIG. 24.
Figure 26:
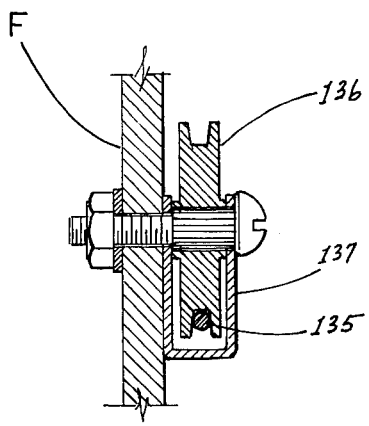
FIG. 26 is a vertical transverse sectional view taken on the line 26—26 of FIG. 23.

Cable 135 threads beneath leg 147 of spring 145. It will thus be seen that should the operator desire to release the bicycle brake assemblies c, 49 upward pulling upon cable 135 adjacent point 138 will cause release of pawl 107' by effecting forward swinging of the lower end thereof; while rearward pawl 139 will be swung forwardly at its upper end out of engagement with driven sprocket 26 by virtue of the rearward rocking of spring 145 with consequent upward and rearward pulling of arm 143. In FIG. 23 the position of cable 135 in spring-raising condition is illustrated by phantom lines. This action is adequate to remove pawl 107' from engagement as long as there is no applied load upon drive sprocket 20 by a back pedaling pressure. The swinging of pawl 139 will overcome the frictional engagement of spring arm 142, 142', which latter will thus slide relatively downwardly of sprocket 26.

In view of the foregoing it will be seen that as pawls 107', 139 are withdrawn from engaged condition with the respective sprockets 20, 26, the upper course of the drive chain extending therebetween will become slack and thereby permit the sprocket 26 to move in a clockwise direction, as viewed in FIG. 23, or, in other words, forwardly, without turning rear wheel 4. The pawls 107', 139 must be lifted out of engagement when the operator desires to move the bicycle backwardly without lifting the rear wheel 4 off the ground.

When cable 135 is pulled upwardly, it first releases pawl 107' and then pawl 139. Accordingly, in view of the foregoing retention of any restrictive tautness of transmission chain 21 is prevented when it is desired to turn the bicycle wheels backwardly or to free same for resumption of forward travel.

Having described my invention, what I claim and desire to obtain by Letters Patent is:

1. In combination with a bicycle having a frame, front and rear wheels supported on said frame, a pedal crank assembly with a main shaft and pedal cranks a drive sprocket carried on said main shaft, a driven sprocket engaged upon said rear wheel, a transmission chain interconnecting said drive and driven sprockets, and front and rear wheel caliper brakes, a brake control assembly comprising a lever swingably mounted on said frame for movement between an upper normal position and a downward position, means engaged upon said main shaft and to said lever, said means being adapted to bindingly restrict rotation of said main shaft upon back pedaling action whereby said lever is swung into downward position, means operatively engaged to said lever inhibiting tension in said transmission chain between said drive sprocket and said driven sprockets when said lever is in downwardly swung position, first and second cable means respectively connecting said lever and said front and rear wheel caliper brakes effecting braking action thereof upon downward swinging of said lever.

2. A brake control assembly as defined in claim 1 and further characterized by said means engaging said main shaft being a drum mounted upon said main shaft, and a flexible band disposed encirclingly of the periphery of said drum.

3. A brake control assembly as defined in claim 2 and further characterized by said band having normally upper and lower end portions engaged on said lever, said lower end portion being engaged beneath said upper end portion whereby upon back pedaling action said lever will be swung into downward position in its shaft-remote portion.

4. A brake control assembly as defined in claim 3 and further characterized by said band being fabricated of metal for snug friction-producing action with said main shaft upon back pedaling action.

5. A brake control assembly as defined in claim 3 and further characterized by the end extremity of the upper portion of said band projecting upwardly beyond said lever, said means inhibiting tension in said transmission chain comprising a detent member engageable with the driven sprocket, and means operatively connecting said band upper extremity and said detent member causing the latter to engage said driven sprocket upon movement of said lever into downward position.

6. A brake control assembly as defined in claim 5 and further characterized by said detent member being a pawl swingably mounted on said bicycle frame, and said means operatively connecting said band upper extremity and said pawl being an element rockably mounted on said frame.

7. A brake control assembly as defined in claim 6 and further characterized by said element comprising a crank mounted on said frame for rockable movement along an axis transverse to the bicycle frame, there being a pull link connecting said crank and said pawl, said upper extremity of said band engaging said crank forwardly of its pivot axis.

8. A brake control assembly as defined in claim 7 and further characterized by said crank having a finger extending forwardly from its pivot axis in elevated relationship to said lever, said band upper and extremity engaging said finger in its pivot axis-remote end portion whereby said crank is urged downwardly and forwardly when said lever is in normal upward position whereby said pawl will be out of engagement with said driven sprocket.

9. A brake control assembly as defined in claim 2 and further characterized by third cable means connecting said lever and a point on said bicycle convenient to the user for manual operation to effect disengagement between said band and said drum by upward pulling action.

10. For use with a bicycle having a frame, front and rear wheels supported on said frame, a pedal crank assembly with a main shaft and pedal cranks, a drive sprocket carried on said main shaft, a driven sprocket engaged upon said rear wheel and a transmission chain interconnecting said drive and driven sprockets, and front and rear wheel caliper brakes, a brake control assembly comprising a lever swingably mounted on said frame between upper normal position and downward position, said lever having a portion rearwardly of said drive sprocket, first and second cable means respectively connecting said lever and said front and rear wheel caliper brakes, a pawl pivotally mounted on said lever on its said rearward portion and being engageable with said drive sprocket upon bicycle back pedaling action, means interconnecting said pawl and said drive sprocket for slipping action when said drive sprocket is rotating in a direction for forward travel of said bicycle and for frictional engagement with said drive sprocket when said drive sprocket is rotating in rearward direction whereby in such latter condition said pawl is rocked into sprocket-engaged relationship, causing downward swinging of said lever causing braking action upon said front and rear wheel caliper brakes.

11. A brake control assembly as defined in claim 10 and further characterized by said means interconnecting said pawl and said drive sprocket comprising a pair of spring arms carried on said pawl and abutting at their forward ends on opposite sides of said drive sprocket.

12. A brake control assembly as defined in claim 11 and further characterized by a flexible member engaged at its lower end to said pawl and extending upwardly about said main shaft and thence with its upper end affixed to said bicycle frame for convenient manipulation by said rider whereby upon upward pulling of the same disengagement of said pawl from said drive sprocket may be effected.

13. A brake control assembly as defined in claim 12 and further characterized by detent means limiting rocking of said pawl in sprocket disengaged condition.

14. A brake control assembly as defined in claim 12 and further characterized by said pawl having a boss at its lower end, the lower end of said flexible member being engaged to said boss.

15. A brake control assembly as defined in claim 10 and further characterized by said lever being of general U-shape form having a forward transverse section, bearing blocks mounted upon said main shaft, said lever transverse section being fixed at its ends to the adjacent bearing blocks, said lever having a first arm and a second arm in substantially axially parallel relationship progressing rearwardly of said bicycle frame from said transverse section, said first and second cable means being secured to said first arm, said second arm having a lateral extension remote from said transverse portion, and said pawl being swingably mounted on said lateral extension.

16. A brake control assembly as defined in claim 15 and further characterized by said bearing blocks being of the split type and each being provided with a bushing.

17. A brake control assembly as defined in claim 15 and further characterized by said first arm being relatively short and said second arm being relatively long whereby the same extends to a point rearwardly of the drive sprocket.

18. A brake control assembly as defined in claim 10 and further characterized by an elongated finger fixed to said lever and progressing rearwardly thereof, said finger having a portion overlying said transmission chain for engaging same upon downward movement of said lever.

19. A brake control assembly as defined in claim 18 and further characterized by an elongated finger being rigid in its forward end portion with the rear end portion of said lever second arm and extending rearwardly thereof whereby upon downward rocking of said lever said finger in its rearward end portion effects a downward force upon said transmission chain proximate said driven sprocket to produce slack therein.

20. A brake control assembly as defined in claim 10 and further characterized by a second pawl rockably mounted on said bicycle frame in its rearward portion being engageable with said driven sprocket, and means interconnecting said pawl and said second pawl for effecting disengagement of said letter when said pawl is pivoted out of engagement with said driven sprocket.

21. A brake control assembly as defined in claim 20 and further characterized by said means interconnecting said pawl and said second pawl including a flexible member, having a lower end and an upper end, the lower end of said flexible member being connected to said pawl from which said flexible member progresses rearwardly, means for directing said flexible member upwardly at a point rearwardly of said second pawl, the upper end of said flexible member being engaged to said bicycle frame for convenient manipulation by the user whereby upon upward pulling of the same said pawl will be disengaged from said drive sprocket, and said interconnecting means also including an operative element interengaging said second pawl and said flexible member.

22. A brake control assembly as defined in claim 21 and further characterized by said operative element comprising an arm in overlying relationship to said flexible member, said arm being engaged to said second pawl so that upon upward pulling of said flexible member said arm will be raised thereby causing swinging of said second pawl into sprocket-disengaged position.

23. In combination with a bicycle having a frame, front and rear wheels supported on said frame, a pedal crank assembly with a main shaft and pedal cranks, a drive sprocket carried on said main shaft, a driven sprocket engaged upon said rear wheel, a transmission chain interconnecting said drive and driven sprockets, and front and rear wheel caliper brakes, a brake control assembly comprising a lever swingably mounted on said frame for movement between an upper normal position and a downward position, locking means engageable with said drive sprocket upon downward swinging of said lever, means engaging said transmission chain upon engagement of said locking means with said drive sprocket for producing slack therein, first and second cable means respectively connecting said lever and said front and rear wheel caliper brakes effecting braking action thereof upon downward swinging of said lever.

24. A brake control assembly as defined in claim 23 and further characterized by said locking means being carried upon said lever, and said means engaging said transmission chain being carried upon said lever.

25. A brake control assembly as defined in claim 23 and further characterized by said locking means being carried upon said lever, and said means engaging said transmission chain being connected to said locking means.

26. The combination defined in claim 23 and further characterized by said brake control assembly means engaging said transmission chain being carried upon said lever and extending rearwardly therefrom.

27. The combination defined in claim 26 and further characterized by the brake control assembly means engaging said transmission chain being an elongated finger having a portion overlying said transmission chain for engaging same upon downward movement of said lever.

28. The combination defined in claim 23 and further characterized by said brake control assembly means engaging said transmission chain comprising a detent engageable with said driven sprocket when said locking means engages said drive sprocket, and means connected to said detent engaging said transmission chain when said detent engages said driven sprocket.

29. The combination defined in claim 28 and further characterized by said means connected to said detent being an arm carried upon said detent and having a portion overlying said transmission chain for engaging same upon locking of said detent with said driven sprocket.

* * * * *